(12) United States Patent
Jiwani et al.

(10) Patent No.: US 11,042,818 B2
(45) Date of Patent: Jun. 22, 2021

(54) METHOD AND SYSTEM FOR ALLOCATING SEATS IN RIDE-SHARING SYSTEMS

(71) Applicant: ANI TECHNOLOGIES PRIVATE LIMITED, Karnataka (IN)

(72) Inventors: Moiaz Jiwani, Chattisgarh (IN); Azimul Mannan, Karnataka (IN)

(73) Assignee: ANI Technologies Private Limited, Bengaluru (IN)

( * ) Notice: Subject to any disclaimer, the term of this patent is extended or adjusted under 35 U.S.C. 154(b) by 204 days.

(21) Appl. No.: 16/122,554

(22) Filed: Sep. 5, 2018

(65) Prior Publication Data
US 2019/0347580 A1   Nov. 14, 2019

(30) Foreign Application Priority Data

May 8, 2018  (IN) .............................. 201841017304

(51) Int. Cl.
*G06Q 10/02* (2012.01)
*G06Q 50/30* (2012.01)
*G08G 1/00* (2006.01)
*G06Q 30/02* (2012.01)
*G01C 21/34* (2006.01)

(52) U.S. Cl.
CPC ......... *G06Q 10/02* (2013.01); *G01C 21/3438* (2013.01); *G06Q 30/0284* (2013.01); *G06Q 50/30* (2013.01); *G08G 1/20* (2013.01)

(58) Field of Classification Search
CPC .... G06Q 10/02; G06Q 50/30; G06Q 30/0284; G08G 1/20; G01C 21/3438

USPC .............................................. 705/5
See application file for complete search history.

(56) References Cited

U.S. PATENT DOCUMENTS

| 6,654,749 | B1 | 11/2003 | Nashed |
| 7,840,427 | B2 | 11/2010 | O'Sullivan |
| 7,974,863 | B2 | 7/2011 | Etzioni et al. |
| 8,200,514 | B1 | 6/2012 | Crean et al. |
| 2006/0020496 | A1 | 1/2006 | Azzarello et al. |
| 2006/0064333 | A1 | 3/2006 | Razza et al. |
| 2007/0143154 | A1 | 6/2007 | Ashby et al. |
| 2007/0226020 | A1 | 9/2007 | Park |
| 2009/0063208 | A1 | 3/2009 | Stirlen et al. |
| 2013/0054279 | A1 | 2/2013 | Sharp et al. |

(Continued)

OTHER PUBLICATIONS

Defining Successful Rideshare Programs a Vision for Kaua'i County, Report Submitted to Kaua'i Planning & Action Alliance by Richard L. Brockmyer, avaialble at: http://www.kauainetwork.org/wp-content/uploads/2010/08/KPAA_Rideshare_Report_Aug_2010.pdf (Year: 2010).*

*Primary Examiner* — Emmett K. Walsh
(74) *Attorney, Agent, or Firm* — Chip Law Group

(57) ABSTRACT

A method and a system for allocating seats in a vehicle for a share-ride in a ride-sharing system are provided. The vehicle is detected in a geographical area and includes one or more seats that are available for the share-ride. A share-ride fare for each available seat is determined based on a defined fare range associated with each available seat. The one or more seats of the vehicle are allocated to one or more passengers based on preferences of the one or more passengers for one or more seat types. The preferences of each passenger are determined based on at least historical travel data or a real-time booking request.

16 Claims, 10 Drawing Sheets

(56) References Cited

U.S. PATENT DOCUMENTS

| | | | |
|---|---|---|---|
| 2014/0337153 A1* | 11/2014 | Terzidis | G06Q 30/0601 |
| | | | 705/26.1 |
| 2015/0363694 A1* | 12/2015 | Banerjee | G06F 9/542 |
| | | | 706/46 |
| 2016/0189064 A1 | 6/2016 | Mao | |
| 2016/0349067 A1* | 12/2016 | Fowe | H04W 4/02 |
| 2016/0356615 A1* | 12/2016 | Arata | G06Q 50/30 |
| 2017/0116696 A1* | 4/2017 | Moore | G06Q 30/04 |
| 2017/0206622 A1 | 7/2017 | Pavlov et al. | |
| 2017/0372236 A1* | 12/2017 | Iwanami | G06Q 10/02 |
| 2018/0039917 A1* | 2/2018 | Buttolo | G06Q 10/0631 |
| 2018/0211352 A1* | 7/2018 | Lim | G06Q 10/02 |
| 2018/0218470 A1* | 8/2018 | Belwafa | G06Q 50/30 |
| 2019/0066250 A1* | 2/2019 | Levy | G01C 21/3697 |
| 2019/0172170 A1* | 6/2019 | Jabour | G06Q 30/0645 |

* cited by examiner

METHOD AND SYSTEM FOR ALLOCATING SEATS IN RIDE-SHARING SYSTEMS

CROSS-RELATED APPLICATIONS

This application claims priority of Indian Application Serial No. 201841017304, filed May 8, 2018, the contents of which are incorporated herein by reference.

FIELD OF THE INVENTION

The present invention relates generally to ride-sharing systems, and more particularly, to a method and a system for allocating seats of a vehicle to passengers in a ride-sharing system.

BACKGROUND

With the improvement in lifestyles of individuals and limited alternatives of public or private transportations, popularity of cab services is continuously increasing for travel between source and destination locations. The individuals avail the cab services for commuting to and from their work places, or when the individuals are engaged in personal activities, such as outstation travel. In modern cities, vehicle transit systems play an important role by providing on-demand cab services to the individuals to travel to their desired destination locations. Generally, a vehicle transit system, for example, a cab service provider is engaged in providing the on-demand cab services to the individuals. The cab service provider deploys a set of cabs (e.g., cars) in a geographical area to supply to the demands from the individuals.

Cabs are usually booked on an individual basis, where an individual or a group of individuals travelling towards the same destination book a cab. When bookings are made on the individual basis, most of the cabs tend to travel with minimum occupancy. Thus, in the event of the increased demands for the cab services at any given time, the number of cabs operating in a particular geographical area also increases. This results in high traffic congestions along various roads of the geographical area. Moreover, the increased number of cabs results in an increase in carbon dioxide ($CO_2$) emissions from the cabs. Thus, various environmental problems, such as air pollution and global warming, have severely increased that are affecting the environment and daily lives of the individuals. To encounter such problems, various cab service providers are following a ride-sharing approach where the individuals share the ride with other individuals. Such ride-sharing approach may help in reducing the number of cabs that operate in the geographical area, thereby reducing the effects of various environmental problems.

In a ride-sharing system, multiple passengers travelling along the same route share a cab. When bookings are made on a shared basis, a ride-fare is divided among the multiple passengers sharing the cab. Thus, a passenger has to spend less as compared to the scenario when the passenger books the cab on the individual basis. Further, in ride-sharing scenarios, the number of cabs operating on the road decreases. Due to decrease in the number of cabs, there is a decrease in the $CO_2$ emissions from the cabs, which reduces the adverse effects on the environment.

Generally, in the ride-sharing system, a passenger boards the cab, followed by other passengers for the shared-ride. The passenger who is first to board the cab might get a seat of his (or her) choice. However, the other passengers might not get seats of their choices. In such a scenario, the other passengers might not be comfortable sitting on the seats that are not preferred by them, and hence, their experiences of the shared-ride may get degraded. Further, such preferences of the passengers for the seats of the cab may trigger cancellations of bookings by the passengers, which might result into loss of passengers and business to the cab service provider. The shared-ride experiences of the passengers can improve if each passenger is allocated with the seat of his (or her) choice. Further, the passengers would prefer booking the cab from the cab service provider that allows the passengers to get the seats of their choices, resulting into the increased business for the cab service provider.

In light of the foregoing, there exists a need for a technical and more reliable solution that solves the above-mentioned problems and manages allocation of seats of the cab that improves the shared-ride experiences of the passengers during the shared-ride. Further, the solution should manage share-ride fares for the shared-ride based on the allocated seats and maximize the shared-ride bookings in the geographical area.

SUMMARY

An embodiment of the present invention provides seat allocation method and system for allocating seats to passengers in a ride-sharing system. The seat allocation method includes one or more operations that are executed by circuitry of the system to allocate seats to the passengers in the ride-sharing system. The circuitry detects a vehicle in a geographical area based on real-time vehicle status and position information of the vehicle obtained from a driver device of a driver of the vehicle. The detected vehicle includes one or more seats available for a share-ride. The availability of the one or more seats in the vehicle is detected based on at least one of vehicle data specified by the driver, current booking information of the vehicle, or sensor data received from one or more sensors associated with the one or more seats in the vehicle.

In an embodiment, the circuitry obtains a share-ride fare for each available seat from the driver device of the driver of the vehicle. Prior to sending the share-ride fare, the driver sets the share-ride fare for each available seat based on a defined fare range associated with each available seat. In another embodiment, the circuitry assigns the share-ride fare to each available seat based on the defined fare range associated with each available seat when the driver has not set the share-ride fare. Further, the circuitry identifies a passenger in the geographical area for the share-ride based on historical travel data of the passenger. The historical travel data of the passenger includes at least historical pick-up and drop-off locations, a frequency of historical rides between each historical pick-up and drop-off locations, a time range of each historical ride, or a historical preference for a seat type and a vehicle type.

After identifying the passenger, the circuitry selects one or more seat types from one or more available seat types of the one or more seats based on historical preferences of the passenger for the one or more seat types. Further, the circuitry renders a user interface on a passenger device of the passenger and presents a booking request to the passenger for the share-ride including at least the one or more seat types and the share-ride fare of each seat type. The booking request may further include a pick-up time and a drop-off time for the passenger. The pick-up time is determined based on the historical travel data of the passenger, and the drop-off time is determined based on at least drop-off locations of co-passengers in the share-ride and real-time traffic conditions. The user interface further includes a plurality of options including at least first, second, and third options. The first, second, and third options are selectable by the passenger to confirm the booking request, to reject the booking request, and to indicate a false positive recommendation, respectively. The circuitry further allocates at least one seat having one of the one or more seat types to the passenger for the share-ride based on a seat selection performed by the passenger by means of the user interface. For example, when the passenger selects a seat type from the one or more seat types and provides an input corresponding to the first option, the circuitry allocates the seat, corresponding to the selected seat type, in the vehicle to the passenger for the share-ride.

Another embodiment of the present invention provides seat allocation method and system for allocating seats to passengers in a ride-sharing system. The seat allocation method includes one or more operations that are executed by circuitry of the system to allocate seats to the passengers in the ride-sharing system. The circuitry receives a booking request for a share-ride from a passenger device of a passenger. The booking request includes at least a preference for a seat type and a share-ride fare for the preferred seat type specified by the passenger. The booking request further includes at least one of a preference for a vehicle type, a pick-up location, a drop-off location, or a pick-up time. In response to the received booking request, the circuitry detects a vehicle in a geographical area of the passenger based on real-time vehicle status and position information of the vehicle obtained from a driver device of a driver of the vehicle. The detected vehicle includes at least the preferred seat type and is available for the share-ride. The availability of one or more seats in the vehicle is detected based on at least one of vehicle data specified by the driver, current booking information of the vehicle, or sensor data received from one or more sensors associated with the one or more seats in the vehicle.

The circuitry checks whether the preferred seat type is available at the share-ride fare specified by the passenger. For example, the system may compare the specified share-ride fare with a defined fare range associated with the preferred seat type. The availability of the preferred seat type is further determined based on a confirmation of the specified share-ride fare for the preferred seat type by the driver of the vehicle. The circuitry renders a user interface on the passenger device corresponding to one of first or second option. The first option indicates the availability of the preferred seat type at the share-ride fare specified by the passenger for the share-ride. The second option indicates an unavailability of the preferred seat type at the specified share-ride fare for the share-ride and includes a new share-ride fare for the preferred seat type. The circuitry allocates the seat associated with the preferred seat type to the passenger for the share-ride based on a confirmation of the first or second option by the passenger.

Thus, the method and the system of the present invention provide a choice to a cab service provider for proactively communicating to the passenger the availability of the preferred seat type at an optimum share-ride fare for daily or regular travels. Further, the passenger has the flexibility with respect to the seat selection, and thereafter can define the share-ride fare for the selected seat in the ride-sharing environment. The present invention further provides the flexibility to the driver of the vehicle to set the share-ride fare for each seat in the vehicle. Thus, the method and the system of the present invention maximize share-ride bookings and occupancies of vehicles in the ride-sharing system and provide improved in-vehicle experiences to the passengers and drivers of the vehicles in the ride-sharing system. Further, due to increase in the share-ride bookings, the number of vehicles operating on the road decreases, thereby, decreasing the $CO_2$ emissions from the vehicles, which reduces the adverse effects on the environment.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
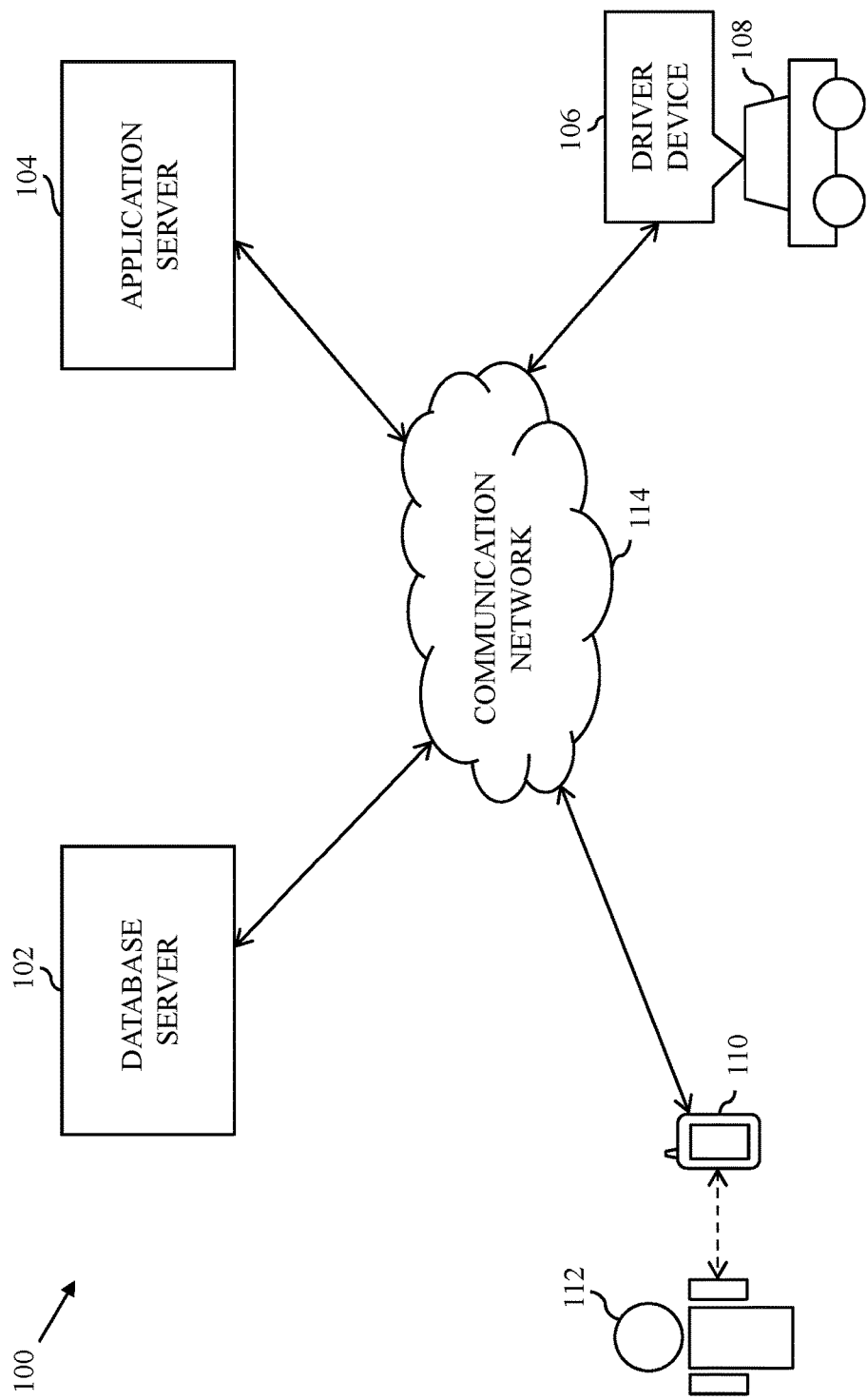
FIG. 1 is a block diagram that illustrates an environment in which various embodiments of the present invention are practiced.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes seat allocation methods and systems for allocating seats to passengers in a ride-sharing system. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

A transportation service is a service in which a vehicle is provided to passengers to transit between source and destination locations specified by the passengers. The vehicle is a means of transport that is deployed by a transport provider to provide the transportation service, such as an on-demand cab service, to the passengers. For example, the vehicle may be an automobile, a bus, a car, a bike, or the like. The transportation service may be a share-ride service or a non-share ride service (i.e., a dedicated ride service). In the share-ride service, the transport provider allows a passenger to book the vehicle for a ride that may be shared by other passengers. In the non-share ride service, the transport provider does not allocate the vehicle to the other passengers, when the vehicle has already been allocated to the passenger for the ride. Hereinafter, various methods and systems for allocating seats to passengers in a share-ride service have been described that will become apparent to a person having ordinary skill in the relevant art.

FIG. 1 is a block diagram that illustrates an environment 100 in which various embodiments of the present invention are practiced. The environment 100 includes a database server 102, an application server 104, a driver device 106 of a vehicle 108, and a passenger device 110 of a passenger 112. The database server 102, the application server 104, the driver device 106, and the passenger device 110 are connected to each other by way of a communication network 114. Examples of the communication network 114 include, but are not limited to, a wireless fidelity (Wi-Fi) network, a light fidelity (Li-Fi) network, a satellite network, the Internet, a mobile network such as a cellular data network, a high speed packet access (HSPA) network, or any combination thereof.

The database server 102 is a data management and storage server that includes a processor (not shown) and a memory (not shown) for managing and storing historical travel data of passengers, such as the passenger 112. The historical travel data includes travel data of rides (e.g., share-rides or non-share rides) taken by the passengers in the past using various vehicles, such as the vehicle 108, provided by a cab service provider. In an exemplary embodiment, the historical travel data of each passenger, such as the passenger 112, may include at least historical pick-up and drop-off locations, a frequency of historical rides between various pick-up and drop-off locations, or a time range of each historical ride that had been taken by the passenger 112. The processor of the database server 102 may determine the time range of each historical ride based on a pick-up time or a ride booking time of each historical ride, and a drop-off time of each historical ride. The historical travel data of the passenger 112 further includes historical preferences of the passenger 112 for one or more types of vehicles (for example, the vehicle 108) and seats in the vehicles. The processor of the database server 102 receives the historical travel data of the passengers from driver or passenger devices, such as the driver device 106 or the passenger device 110 and stores the historical travel data in the memory of the database server 102.

The database server 102 further manages and stores passenger information of the passengers and driver information of the drivers. For example, the passenger information of each passenger may include at least a passenger name, a passenger contact number, or information pertaining to a passenger account of each passenger registered with the cab service provider. Similarly, the driver information of each driver may include at least a driver name, a registered vehicle, a vehicle type, or information pertaining to a driver account of each driver registered with the cab service provider. In an embodiment, the processor of the database server 102 may generate a tabular data structure including one or more rows and columns for storing the information of the passengers (or the drivers) in a structured manner in the memory. For example, each row may be associated with a unique passenger identifier (ID) of each passenger, and one or more columns corresponding to each row that may indicate the passenger name, the passenger ID, the historical pick-up and drop-off locations, the frequency of historical rides between various historical pick-up and drop-off locations, the time range of each historical ride, or the historical preferences for the vehicles or seats of the vehicles.

The database server 102 may receive a query from the application server 104 over the communication network 114 to extract the information (of at least one passenger or driver) stored in the memory of the database server 102. In response to the received query, the database server 102 retrieves and provides the requested information to the application server 104 over the communication network 114. Examples of the database server 102 include, but are not limited to, a personal computer, a laptop, or a network of computer systems.

The application server 104 is a computing device, a software framework, or a combination thereof, that may provide a generalized approach to create the application server implementation. In an embodiment, the operation of the application server 104 may be dedicated to execution of procedures, such as, but not limited to, programs, routines, or scripts stored in a memory for supporting its applied applications. In one embodiment of the present invention, the application server 104 processes the historical travel data, including that of a geographical area, and identifies the passengers, such as the passenger 112 for a share-ride, in the geographical area after detecting an available vehicle, such as the vehicle 108 including one or more seats available for the share-ride. The application server 104 renders a notification interface on the passenger device 110 of the passenger 112 over the communication network 114. The notification interface presents a booking request to the passenger 112 for the share-ride including at least one or more seat types (hereinafter, seat types) associated with one or more available seats (hereinafter, available seats) in the vehicle 108. The seat types are selected from available seat types of the available seats based on historical preferences of the passenger 112. The notification interface further includes a share-ride fare associated with each seat type. In one embodiment, a driver of the vehicle 108 sets the share-ride fare for each available seat. In another embodiment, the application server 104 assigns the share-ride fare for each available seat when the driver of the vehicle 108 has selected a flexible option (i.e., the driver does not want to set the share-ride fare) and allows the application server 104 to set the share-ride fare for each available seat in the vehicle 108. Further, based on a seat selection performed by the passenger 112 by means of the rendered notification interface, the application server 104 allocates at least one seat associated with at least one seat type to the passenger 112 for the share-ride.

In another embodiment of the present invention, the application server 104 receives a booking request for a share-ride from the passenger device 110 of the passenger 112. The booking request includes at least a preference for a seat type and a share-ride fare for the preferred seat type specified by the passenger 112. Based on the received booking request, the application server 104 detects an available vehicle, such as the vehicle 108 including the preferred seat type available for the share-ride, in a geographical area of the passenger 112. After detecting the vehicle 108, the application server 104 determines whether the preferred seat type is available at the share-ride fare specified by the passenger 112. The application server 104 renders a notification interface on the passenger device 110 of the passenger 112, and the notification interface presents one or more booking options, such as a first or second booking option. The application server 104 renders the notification interface corresponding to the first booking option when the preferred seat type is available for the share-ride at the share-ride fare specified by the passenger 112. The application server 104 renders the notification interface corresponding to the second booking option when the preferred seat type is not available for the share-ride at the share-ride fare specified by the passenger 112. In such a scenario, the notification interface corresponding to the second booking option includes a new share-ride fare for the preferred seat type. The application server 104 allocates the seat associated with the preferred seat type to the passenger 112 for the share-ride based on a confirmation of the first or second booking option by the passenger 112.

Various operations of the application server 104 have been described in detail in conjunction with FIGS. 2-8. The application server 104 may be realized through various web-based technologies, such as, but not limited to, a Java web-framework, a .NET framework, a PHP framework, or any other web-application framework. Examples of the application server 104 include, but are not limited to, a personal computer, a laptop, or a network of computer systems.

The driver device 106 is a computing device that is used by the driver of the vehicle 108 to perform one or more activities by means of a software application installed on the driver device 106. For example, the driver of the vehicle 108 may use the driver device 106 to input vehicle data of the vehicle 108 that is transmitted by the driver device 106 to the application server 104. The vehicle data may include at least a type of the vehicle 108 (e.g., a hatchback vehicle, a sedan vehicle, a multi-utility vehicle (MUV), a sports utility vehicle (SUV), or the like) or the available seats (e.g., a front seat, a back row right seat, a back row middle seat, or the like) in the vehicle 108. The driver may further use the driver device 106 to set the share-ride fare for each available seat. The driver may further use the driver device 106 to either accept, reject, or modify the share-ride fare specified by the passenger 112.

The driver may use the driver device 106 to view an upcoming ride request (e.g., a share-ride or non-share ride request), and accordingly, accept or reject the upcoming ride request. The driver may further use the driver device 106 to view and follow directions along a route, between pick-up and drop-off locations of each passenger, provided by the application server 104. Further, the driver device 106 may transmit information, such as an availability status, a current booking status, a ride completion status, a pick-up time, a drop-off time, a ride fare, or the like, to the application server 104. In an exemplary embodiment, the driver device 106 may be a vehicle head unit. In another exemplary embodiment, the driver device 106 may be an external communication device, such as a smartphone, a tablet computer, a laptop, or any other portable communication device, that is placed inside the vehicle 108.

The passenger device 110 is a computing device that is used by the passenger 112 to perform one or more activities by means of a software application installed on the passenger device 110. For example, the passenger 112 uses the passenger device 110 to schedule the share-ride. To schedule the share-ride, the passenger 112 initiates the booking request for the share-ride by means of the installed service application on the passenger device 110. The booking request includes at least the preference for the seat type and the share-ride fare for the preferred seat type specified by the passenger 112. The booking request may further include other ride-related information, for example, a vehicle type, a pick-up location, a drop-off location, a pick-up time, or other service-related details and preferences. The various modes of input used by the passenger 112 to initiate the booking request may include, but are not limited to, a touch-based input, a text-based input, a voice-based input, a gesture-based input, or a combination thereof. Further, based on a confirmation of the booking request for the share-ride by the passenger 112, the passenger device 110 transmits the booking request to the application server 104 over the communication network 114. In another embodiment, the installed service application transmits the booking request to the application server 104 over the communication network 114.

The passenger 112 further uses the passenger device 110 to view various notification interfaces (one at a time) rendered by the application server 104. Based on the notification interfaces, the passenger 112 may provide an input either to confirm, reject, or modify the booking request or allocation proposed by the application server 104. The passenger 112 further uses the passenger device 110 to view allocation information including the driver information, vehicle information, seat allocation information, share-ride fare, or the like provided by the application server 104 based on the allocated vehicle, such as the vehicle 108. Examples of the passenger device 110 include, but are not limited to, a personal computer, a laptop, a smartphone, and a tablet computer.

Figure 2:
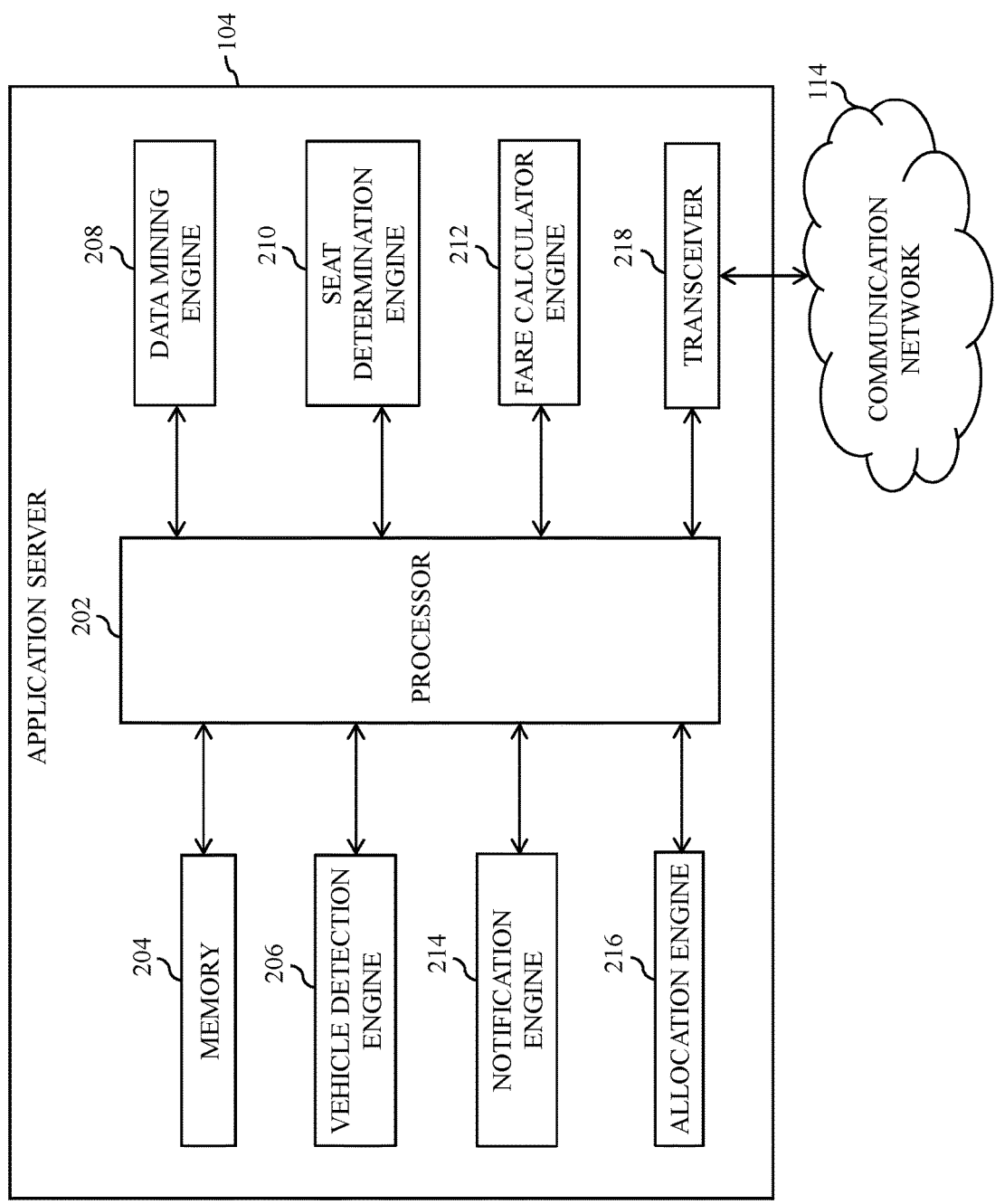
FIG. 2 is a block diagram that illustrates an application server of the environment of FIG. 1, in accordance with an embodiment of the present invention.

Referring now to FIG. 2, a block diagram that illustrates the application server 104 of the environment 100 of FIG. 1 is shown, in accordance with an embodiment of the present invention. The application server 104 includes a processor 202, a memory 204, a vehicle detection engine 206, a data mining engine 208, a seat selection engine 210, a fare calculator engine 212, a notification engine 214, an allocation engine 216, and a transceiver 218 that communicate with each other by way of a communication bus (not shown).

The processor 202 includes suitable logic, circuitry, and/or interfaces that are operable to execute one or more instructions stored in the memory 204 to perform one or more operations. For example, the processor 202 controls and manages detection of the vehicles for the share-rides by means of the vehicle detection engine 206, controls and manages extraction of requisite information from the database server 102 by means of the data mining engine 208, and controls and manages allocation of the seats to the passengers for the share-rides by means of the seat selection engine 210. The processor 202 further controls and manages computation of the share-ride fare for each passenger by means of the fare calculator engine 212, controls and manages rendering of the notification interfaces on the passenger devices of the passengers (or driver devices of the drivers of the vehicles) by means of the notification engine 214, and controls and manages allocation of the vehicles to the passengers for the share-rides by means of the allocation engine 216.

In an embodiment, the processor 202 may operate as a master processing unit, and the vehicle detection engine 206, the data mining engine 208, the seat selection engine 210, the fare calculator engine 212, the notification engine 214, and the allocation engine 216 may operate as slave processing units. In such a scenario, the processor 202 may instruct the vehicle detection engine 206, the data mining engine 208, the seat selection engine 210, the fare calculator engine 212, the notification engine 214, and the allocation engine 216 to perform their corresponding operations either independently or in conjunction with each other. Examples of the processor 202 include, but are not limited to, an application-specific integrated circuit (ASIC) processor, a reduced instruction set computing (RISC) processor, a complex instruction set computing (CISC) processor, and a field-programmable gate array (FPGA). It will be apparent to a person skilled in the art that the processor 202 is compatible with multiple operating systems.

The memory 204 includes suitable logic, circuitry, and/or interfaces to store one or more instructions that are executed by the processor 202, the vehicle detection engine 206, the data mining engine 208, the seat selection engine 210, the fare calculator engine 212, the notification engine 214, and the allocation engine 216 to perform their operations. The memory 204 stores the historical travel data, the passenger information, or the driver information extracted from the database server 102. The memory 204 further stores the booking request initiated by the passenger 112 in a real-time. The memory 204 further stores the vehicle data and the share-ride fare for each available seat specified by the driver of the vehicle 108. Examples of the memory 204 include, but are not limited to, a random-access memory (RAM), a read-only memory (ROM), a programmable ROM (PROM), and an erasable PROM (EPROM).

The vehicle detection engine 206 includes suitable logic, circuitry, and/or interfaces that are operable to execute one or more instructions stored in the memory 204 to perform one or more operations. For example, the vehicle detection engine 206 detects the vehicles in the geographical area, for example, the vehicle 108 that includes the seats available for the share-ride. The vehicle 108 may be detected based on real-time vehicle status and position information of the vehicle 108 obtained from the driver device 106 of the driver of the vehicle 108. The real-time vehicle status information indicates a booking status of the vehicle 108 in a real-time i.e., it may be determined whether the vehicle 108 is fully occupied or partially occupied by the passengers, or is empty i.e., there are no passengers in the vehicle 108. The real-time position information includes Global Positioning System (GPS) information and indicates the current location of the vehicle 108. The vehicle detection engine 206 may be implemented by means of one or more processors, such as, but are not limited to, an ASIC processor, a RISC processor, a CISC processor, and an FPGA.

The data mining engine 208 includes suitable logic, circuitry, and/or interfaces that are operable to execute one or more instructions stored in the memory 204 to perform one or more operations. For example, the data mining engine 208 extracts the historical travel data from the database server 102, including that of the geographical area in which the vehicle 108 has been detected by the vehicle detection engine 206, and stores in the memory 204. The data mining engine 208 further extracts the passenger information of the passengers, for example, the passenger 112 or the driver information of the drivers, for example, the driver of the vehicle 108, from the database server 102, and stores in the memory 204. The data mining engine 208 further obtains the real-time vehicle status and position information from the driver device 106, and stores in the memory 204. The data mining engine 208 further obtains the vehicle data of the vehicle 108 and the share-ride fare for each available seat in the vehicle 108 from the driver device 106 of the vehicle 108, and stores in the memory 204.

The data mining engine 208 further obtains current booking information of the vehicle 108 from the database server 102 (or the driver device 106 of the vehicle 108), and stores in the memory 204. The current booking information of the vehicle 108 includes real-time allocation information of the seats in the vehicle 108 that indicates a first set of seats from the seats that have been already allocated to the passengers and a second set of seats from the seats that have not been allocated to any passenger. The data mining engine 208 further communicates with one or more sensors (shown in FIG. 3) associated with the seats in the vehicle 108, receives sensor data from the one or more sensors, and stores in the memory 204. The sensor data of a seat indicates whether the seat is occupied by any passenger or is unoccupied and is available for allocation to other passengers. The data mining engine 208 may be implemented by means of one or more processors, such as, but not limited to, an ASIC processor, a RISC processor, a CISC processor, and an FPGA.

The seat selection engine 210 includes suitable logic, circuitry, and/or interfaces that are operable to execute one or more instructions stored in the memory 204 to perform one or more operations. For example, the seat selection engine 210 determines seating preferences of the passengers, and stores in the memory 204. The seating preferences of the passengers, for example, for the passenger 112, may be determined based on the historical travel data of the passenger 112 or the booking request initiated by the passenger 112. The seat selection engine 210 also selects the seat types based on the seating preferences of the passenger 112. The seat selection engine 210 may be implemented by means of one or more processors, such as, but not limited to, an ASIC processor, a RISC processor, a CISC processor, and an FPGA.

The fare calculator engine 212 includes suitable logic, circuitry, and/or interfaces that are operable to execute one or more instructions stored in the memory 204 to perform one or more operations. For example, the fare calculator engine 212 calculates the share-ride fare for each available seat in the vehicle 108. In one embodiment, the share-ride fare for each available seat is the same as the share-ride fare defined by the driver of the vehicle 108. The driver may define the share-ride fare for each available seat based on a defined fare range associated with each available seat. In another embodiment, when the driver of the vehicle 108 has not defined the share-ride fare, the fare calculator engine 212 calculates the share-ride fare for each available seat. The share-ride fare may be determined based on the defined fare range associated with each available seat and/or a density of historical demands associated with the geographical area. For example, if the density of historical demands is on a lower side (i.e., less than a defined threshold), the fare calculator engine 212 determines the share-ride fare such that the share-ride fare is on a lower side of the defined fare range that may help to maximize share-ride bookings by the passengers in the geographical area. Similarly, if the density of historical demands is on a higher side (i.e., greater than or equal to the defined threshold), then the fare calculator engine 212 determines the share-ride fare such that the share-ride fare is on a higher side of the defined fare range that may help to maximize gross merchandise value (GMV).

In yet another embodiment, the fare calculator engine 212 calculates the share-ride fare for each available seat based on the share-ride fare defined by the passenger 112. For example, the share-ride fare for each available seat is the same as the share-ride fare defined by the passenger 112 when the defined share-ride fare is within the defined fare range and the driver of the vehicle 108 has confirmed the share-ride fare defined by the passenger 112. However, when there is a conflict between the driver of the vehicle 108 and the passenger 112 with respect to the defined share-ride fare by the passenger 112, the fare calculator engine 212 may calculate a new share-ride fare based on the share-ride fare defined by the driver and/or the passenger 112. The new share ride fare may be greater than or less than the share-ride fare specified by the driver or the passenger 112. After calculating the share-ride fare for each available seat, the fare calculator engine 212 stores the share-ride fare in the memory 204. The fare calculator engine 212 may be implemented by means of one or more processors, such as, but not limited to, an ASIC processor, a RISC processor, a CISC processor, and an FPGA.

The notification engine 214 includes suitable logic, circuitry, and/or interfaces that are operable to execute one or more instructions stored in the memory 204 to perform one or more operations. For example, the notification engine 214 renders one or more notification interfaces on the passenger device 110 over the communication network 114. A notification interface is a graphical user interface (GUI) that is rendered by the notification engine 214 on a display screen (not shown) of the passenger device 110 and allows the passenger 112 to interact with the application server 104 by means of information and options (e.g., graphical icons and visual indicators) included in the GUI.

In one embodiment, based on the detected vehicle (e.g., the vehicle 108) and the identified passenger (e.g., the passenger 112) in the geographical area, the notification engine 214 renders a first notification interface (shown in FIG. 4A) on the passenger device 110 of the passenger 112, and presents the booking request to the passenger 112 for the share-ride. The booking request includes at least the seat types selected from the available seats and the share-ride fare of each seat type. The seat types are selected based on the historical preferences of the passenger 112 for the seat types. The share-ride fare of each seat type is determined by the fare calculator engine 212. The booking request further includes a pick-up time and a drop-off time for the passenger 112. The pick-up time is determined based on the historical travel data of the passenger 112, and the drop-off time is determined based on at least drop-off locations of co-passengers including the passenger 112 in the share-ride and real-time traffic conditions. The first notification interface further includes a plurality of options including at least confirm booking, reject booking, and false positive options. The confirm booking option is selectable by the passenger 112 to confirm the booking request, the reject booking option is selectable by the passenger 112 to reject the booking request, and the false positive option is selectable by the passenger 112 to indicate a false positive recommendation.

In another embodiment, based on the booking request initiated by the passenger 112, the notification engine 214 renders a second notification interface (shown in FIGS. 4B and 4C) corresponding to one of the first or second booking options on the passenger device 110 of the passenger 112. The second notification interface corresponding to the first booking option indicates the availability of the preferred seat type for the share-ride at the share-ride fare specified by the passenger 112. The second notification interface corresponding to the first booking option further includes a plurality of options including at least confirm booking and reject booking options for confirming and rejecting the booking request. In the absence of the first booking option, the notification engine 214 renders the second notification interface corresponding to the second booking option on the passenger device 110. The second notification interface corresponding to the second booking option indicates an unavailability of the preferred seat type for the share-ride at the specified share-ride fare and includes the new share-ride fare for the preferred seat type. The second notification interface also includes the plurality of options including at least the confirm booking and reject booking options. The notification engine 214 may be implemented by means of one or more processors, such as, but not limited to, an ASIC processor, a RISC processor, a CISC processor, and an FPGA.

The allocation engine 216 includes suitable logic, circuitry, and/or interfaces that are operable to execute one or more instructions stored in the memory 204 to perform one or more operations. For example, the allocation engine 216 allocates the seats in the vehicle 108 to the passengers, such as the passenger 112 for the share-ride. In one embodiment, the allocation engine 216 allocates at least one seat associated with one of the seat types to the passenger 112 for the share-ride based on the seat selection performed by the passenger 112. Further, the allocation engine 216 allocates the vehicle 108 with the allocated seat to the passenger 112 for the share-ride based on a confirmation input provided by the passenger 112 corresponding to the confirm booking option on the first notification interface. In another embodiment, the allocation engine 216 allocates the vehicle 108 with the preferred seat requested by the passenger 112 at the specified share-ride fare or at the new share-ride fare based on a confirmation input provided by the passenger 112 corresponding to the confirm booking option on the second notification interface. The allocation engine 216 may be implemented by means of one or more processors, such as, but not limited to, an ASIC processor, a RISC processor, a CISC processor, and an FPGA.

The transceiver 218 includes suitable logic, circuitry, and/or interfaces that are operable to transmit (or receive) data to (or from) various servers or devices, such as the database server 102, the driver device 106, or the passenger device 110 the communication network 114. Examples of the transceiver 218 include, but are not limited to, an antenna, a radio frequency transceiver, a wireless transceiver, and a Bluetooth transceiver. The transceiver 218 communicates with the database server 102, the driver device 106, or the passenger device 110 using various wired and wireless communication protocols, such as TCP/IP (Transmission Control Protocol/Internet Protocol), UDP (User Datagram Protocol), 2nd Generation (2G), 3rd Generation (3G), 4th Generation (4G), or 5th Generation (5G) communication protocols, or any combination thereof.

Figure 3:
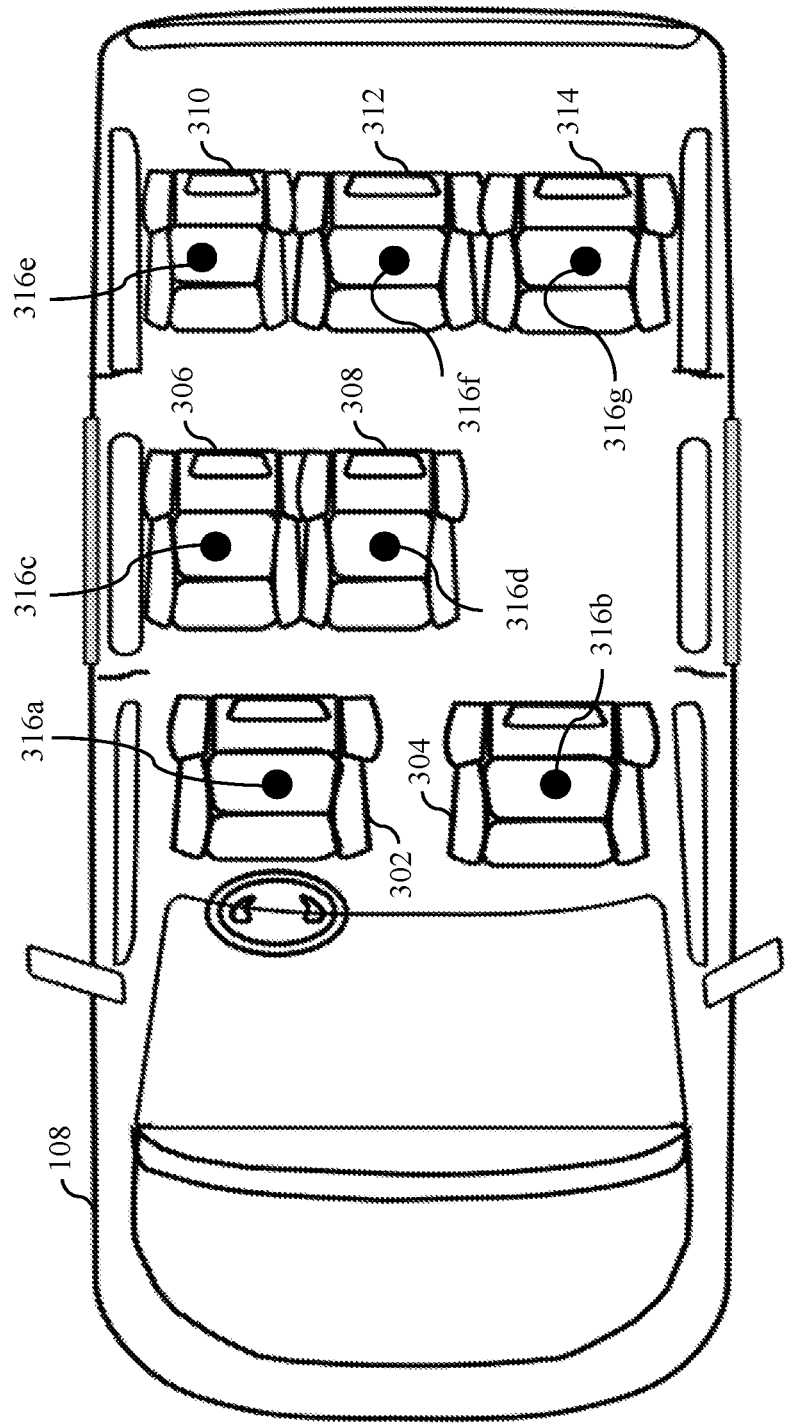
FIG. 3 is a block diagram that illustrates a seating arrangement in a vehicle of the environment of FIG. 1, in accordance with an embodiment of the present invention.

Referring now to FIG. 3, a block diagram that illustrates a seating arrangement in the vehicle 108 of the environment of FIG. 1 is shown, in accordance with an embodiment of the present invention. The seating arrangement includes the various seats, such as the seats 302-314, in the vehicle 108. The seats 302-314 have one or more sensors, such as sensors 316a-316g, associated with them respectively. The seat 302 is reserved for the driver of the vehicle 108 who transports the passengers from their pick-up locations to their corresponding drop-off locations. The seats 304-314 are reserved for the passengers who want vehicle services on a ride-sharing basis. As described above, the driver of vehicle 108 may set the share-ride fare of each seat type associated with the vehicle 108 by means of the installed service application on the driver device 106 of the driver. The different seat types of the seats 304-314 in the vehicle 108 and the corresponding share-ride fare have been illustrated below in Table 1:

TABLE 1

Exemplary seat types

| Seat ID | Seat type | Share-ride fare (in INR per Kilometer (Km)) |
|---|---|---|
| F1 | Front Row Left Window Seat | INR 12 per Km |
| M1 | Middle Row Right Window Seat | INR 10 per Km |
| M2 | Middle Row Middle Seat | INR 8.5 per Km |
| B1 | Back Row Right Window Seat | INR 7 per Km |
| B2 | Back Row Middle Seat | INR 7 per Km |
| B3 | Back Row Left Window Seat | INR 6.5 per Km |

The seat 304 is a front row left window seat, and the driver has set the share-ride fare as INR 12 per Km for the seat 304. The seat 306 is a middle row right window seat, and the driver has set the share-ride fare as INR 10 per Km for the seat 306. The seat 308 is a middle row middle seat, and the driver has set the share-ride fare as INR 8.5 per Km for the seat 308. The seat 310 is a back row right window seat, and the driver has set the share-ride fare as INR 7 per Km for the seat 310. The seat 312 is a back row middle seat, and the driver has set the share-ride fare as INR 7 per Km for the seat 312. The seat 314 is a back row left window seat, and the driver has set the share-ride fare as INR 6.5 per Km for the seat 314. In an embodiment, the driver sets the share-ride fare for each seat, as described above, based on the defined fare range including a minimum fare and a maximum fare. The driver cannot set the share-ride fare that is less than the minimum fare of the defined fare range and is greater than the maximum fare of the defined fare range. Further, the defined fare range may be different for the different seat types in the vehicle 108.

Further, in an embodiment, each of the seats 302-314 includes the sensors 316a-316g for sensing the presence of any driver or any passenger sitting on each seat. Each sensor from the sensors 316b-316g may be operable to sense the presence of the passengers sitting on the corresponding seats 304-314, for example, the passenger 112 sitting on the seat 304, based on various parameters, such as, but not limited to, force, pressure, or area occupied on the seat 304 that have been sensed by the sensor 316b associated with the seat 304.

Figure 4A:
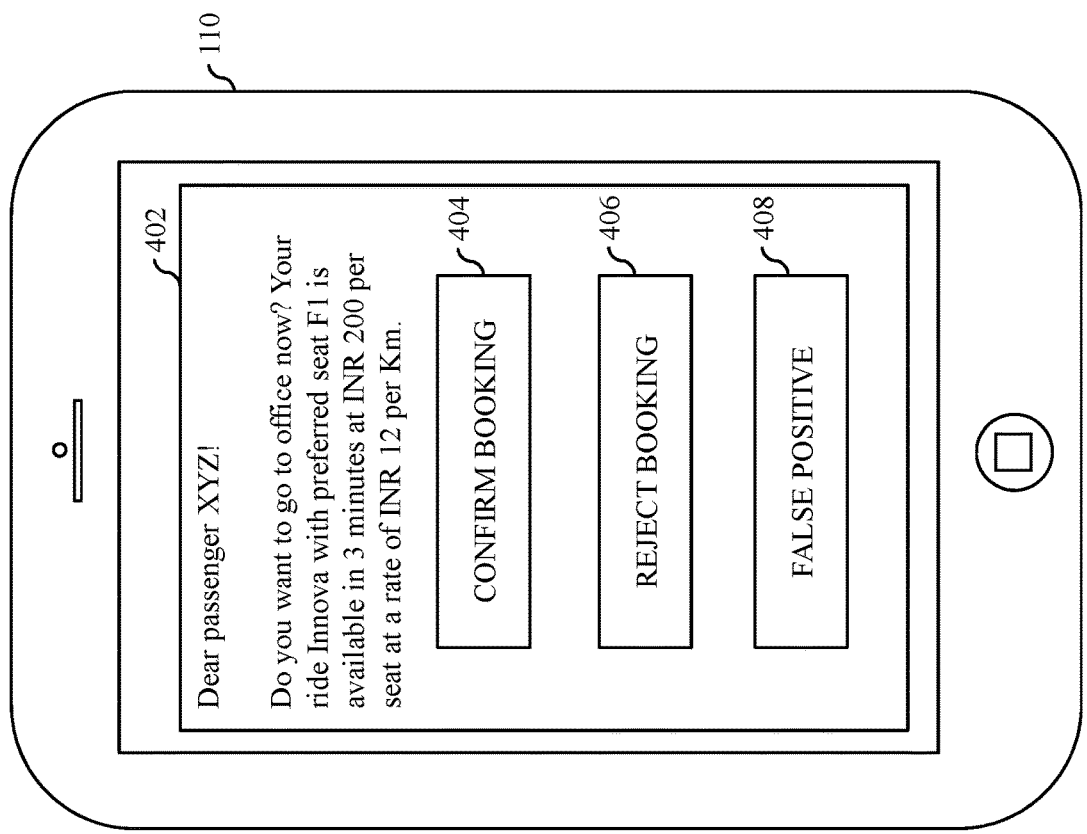
FIG. 4A is a block diagram that illustrates a first notification interface rendered on a passenger device of the environment of FIG. 1, in accordance with an embodiment of the present invention.

Referring now to FIG. 4A, a block diagram that illustrates the first notification interface 402 rendered on the passenger device 110 of the environment of FIG. 1 is shown, in accordance with an embodiment of the present invention. The notification engine 214 renders the first notification interface 402 on the passenger device 110 of the passenger 112, when the vehicle detection engine 206 detects the vehicle 108 including the seats available for the share-ride, the processor 202 identifies the passenger 112 in the geographical area of the vehicle 108, and the seat selection engine 210 determines the seating preferences of the passenger 112. The first notification interface 402 presents the booking request for the share-ride including at least the seat types selected from the available seat types and the share-ride fare for each seat type.

The seat selection engine 210 selects the seat types based on the historical seating preferences of the passenger 112. The booking request further includes at least one of the pick-up time or the drop-off time for the passenger 112. In an exemplary scenario, the booking request may be displayed as "Dear passenger XYZ! Do you want to go to office now? Your ride Innova with preferred seat F1 is available in 3 minutes at INR 200 per seat at a rate of INR 12 per Km", as shown in FIG. 4A.

The first notification interface 402 further includes the plurality of options, such as first, second, and third options 404-408. The first option 404 is the confirm booking option that is selectable by the passenger 112 to confirm the booking request. The second option 406 is the reject booking option that is selectable by the passenger 112 to reject the booking request. The third option 408 is the false positive option that is selectable by the passenger 112 to report that the recommendation is not correct and mark the recommendation as a false positive. The allocation engine 216 allocates the vehicle 108 and the preferred seat (i.e., the seat associated with the preferred seat type of the passenger 112) in the vehicle 108 to the passenger 112 for the share-ride when the passenger 112 selects the first option 404 (i.e., the confirm booking option). Further, the allocation engine 216 does not allocate the vehicle 108 and the preferred seat in the vehicle 108 to the passenger 112 for the share-ride when the passenger 112 selects the second option 406 (i.e., the reject booking option). Further, based on the option selected by the passenger 112, the application server 104 re-learns the travel preferences of the passenger 112 from the historical travel data and new data, and may generate new set of travel-related recommendations for future rides.

Figure 4B:
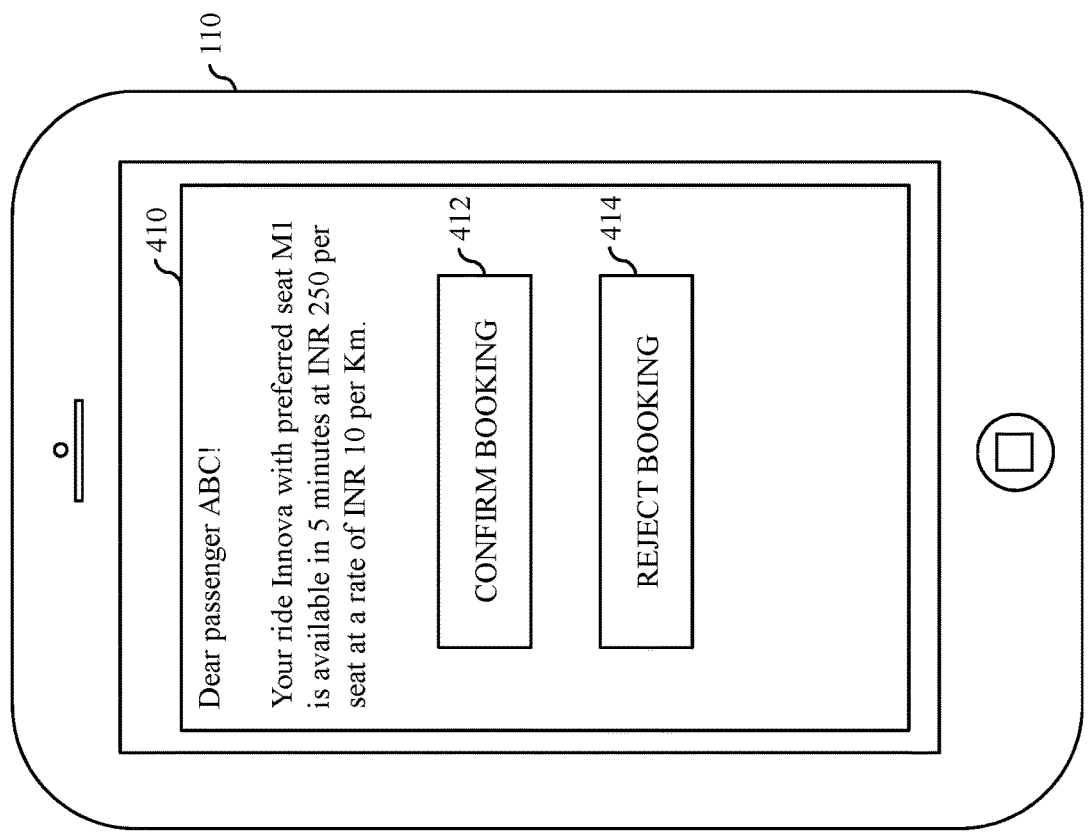
FIG. 4B is a block diagram that illustrates a second notification interface rendered on a passenger device of the environment of FIG. 1, in accordance with an embodiment of the present invention.

Referring now to FIG. 4B, a block diagram that illustrates the second notification interface 410 rendered on the passenger device 110 of the environment of FIG. 1 is shown, in accordance with an embodiment of the present invention. The notification engine 214 renders the second notification interface 410 on the passenger device 110 of the passenger 112 when the passenger 112 has initiated the booking request for the share-ride. The booking request initiated by the passenger 112 includes at least the seating preference for the seat type and the share-ride fare for the preferred seat type. The passenger 112 defines the share-ride fare for the preferred seat type based on the defined fare range associated with the preferred seat type. In response to the booking request initiated by the passenger 112, the vehicle detection engine 206 detects the vehicles, such as the vehicle 108 including the preferred seat type available for the share-ride and performs a check to determine whether the preferred seat type is available for the share-ride at the share-ride fare specified by the passenger 112. The notification engine 214 renders the second notification interface 410 on the passenger device 110 when the preferred seat type in the vehicle 108 is available for the share-ride at the share-ride fare specified by the passenger 112.

The second notification interface 410 presents the first booking option that may be displayed as "Dear passenger ABC! Your ride Innova with preferred seat M1 is available in 5 minutes at INR 250 per seat at a rate of INR 10 per Km", as shown in FIG. 4B. The second notification interface 410 further includes the plurality of options, such as first and second options 412 and 414. The first option 412 is the confirm booking option that is selectable by the passenger 112 to confirm the first booking option. The second option 414 is the reject booking option that is selectable by the passenger 112 to reject the first booking option. The allocation engine 216 allocates the vehicle 108 and the preferred seat type in the vehicle 108 to the passenger 112 for the share-ride when the passenger 112 selects the first option 412 (i.e., the confirm booking option). Further, the allocation engine 216 does not allocate the vehicle 108 and the preferred seat type in the vehicle 108 to the passenger 112 for the share-ride when the passenger 112 selects the second option 414 (i.e., the reject booking option).

Figure 4C:
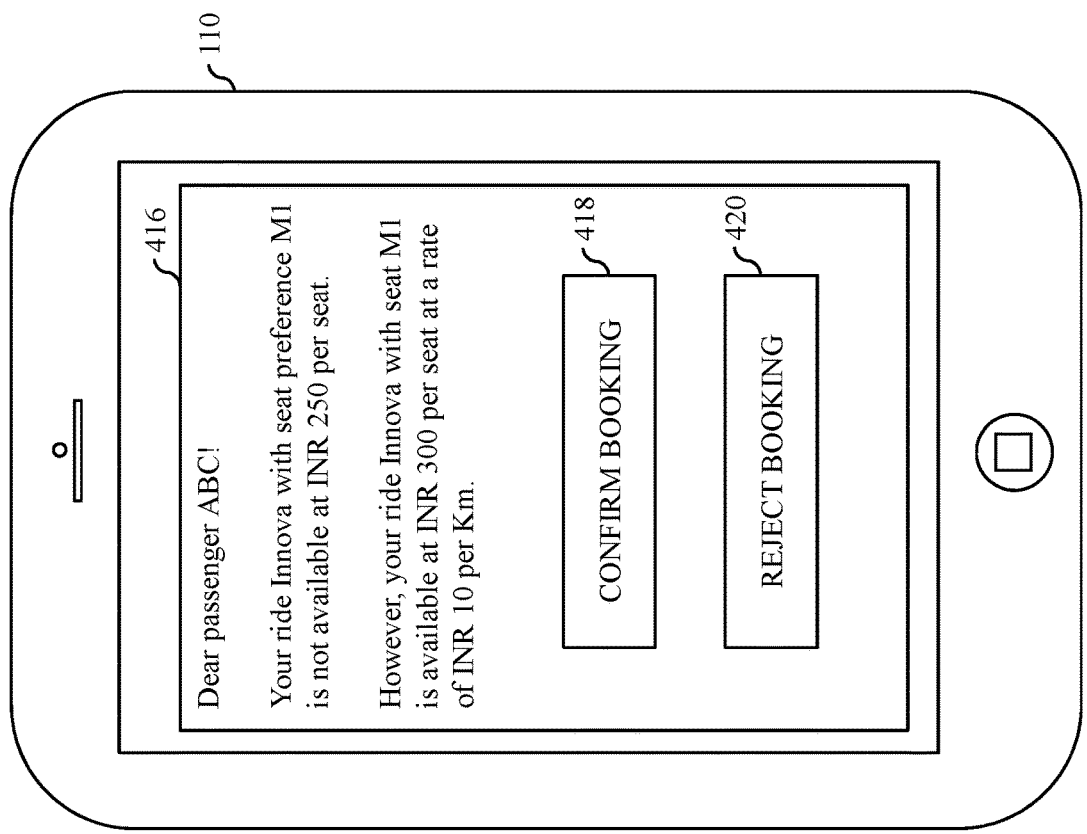
FIG. 4C is a block diagram that illustrates a second notification interface rendered on a passenger device of the environment of FIG. 1, in accordance with another embodiment of the present invention.

Referring now to FIG. 4C, a block diagram that illustrates the second notification interface 416 rendered on the passenger device 110 of the environment of FIG. 1 is shown, in accordance with an embodiment of the present invention. The notification engine 214 renders the second notification interface 416 on the passenger device 110 of the passenger 112 when the passenger 112 has initiated the booking request for the share-ride. The booking request initiated by the passenger 112 includes at least the seating preference for the seat type and the share-ride fare for the preferred seat type. The passenger 112 defines the share-ride fare for the preferred seat type based on the defined fare range associated with the preferred seat type. In response to the booking request initiated by the passenger 112, the vehicle detection engine 206 detects the vehicles, such as the vehicle 108 including the preferred seat type available for the share-ride and performs a check to determine whether the preferred seat type is available for the share-ride at the share-ride fare specified by the passenger 112. The notification engine 214 renders the second notification interface 416 on the passenger device 110 when the preferred seat type in the vehicle 108 is available for the share-ride but not at the share-ride fare specified by the passenger 112. In such a scenario, the new share share-ride fare is determined may be greater than or less than the share-ride fare specified by the passenger 112.

The second notification interface 416 presents the second booking option that may be displayed as "Dear passenger ABC! Your ride Innova with seat preference M1 is not available at INR 250 per seat. However, your ride Innova with seat M1 is available at INR 300 per seat at a rate of INR 10 per Km", as shown in FIG. 4C. The second notification interface 416 further includes the plurality of options, such as first and second options 418 and 420. The first option 418 is the confirm booking option that is selectable by the passenger 112 to confirm the second booking option. The second option 420 is the reject booking option that is selectable by the passenger 112 to reject the second booking option. The allocation engine 216 allocates the vehicle 108 and the preferred seat in the vehicle 108 to the passenger 112 for the share-ride when the passenger 112 selects the first option 418 (i.e., the confirm booking option). Further, the allocation engine 216 may not allocate the vehicle 108 and the preferred seat in the vehicle 108 to the passenger 112 for the share-ride when the passenger 112 selects the second option 420 (i.e., the reject booking option).

Figure 5:
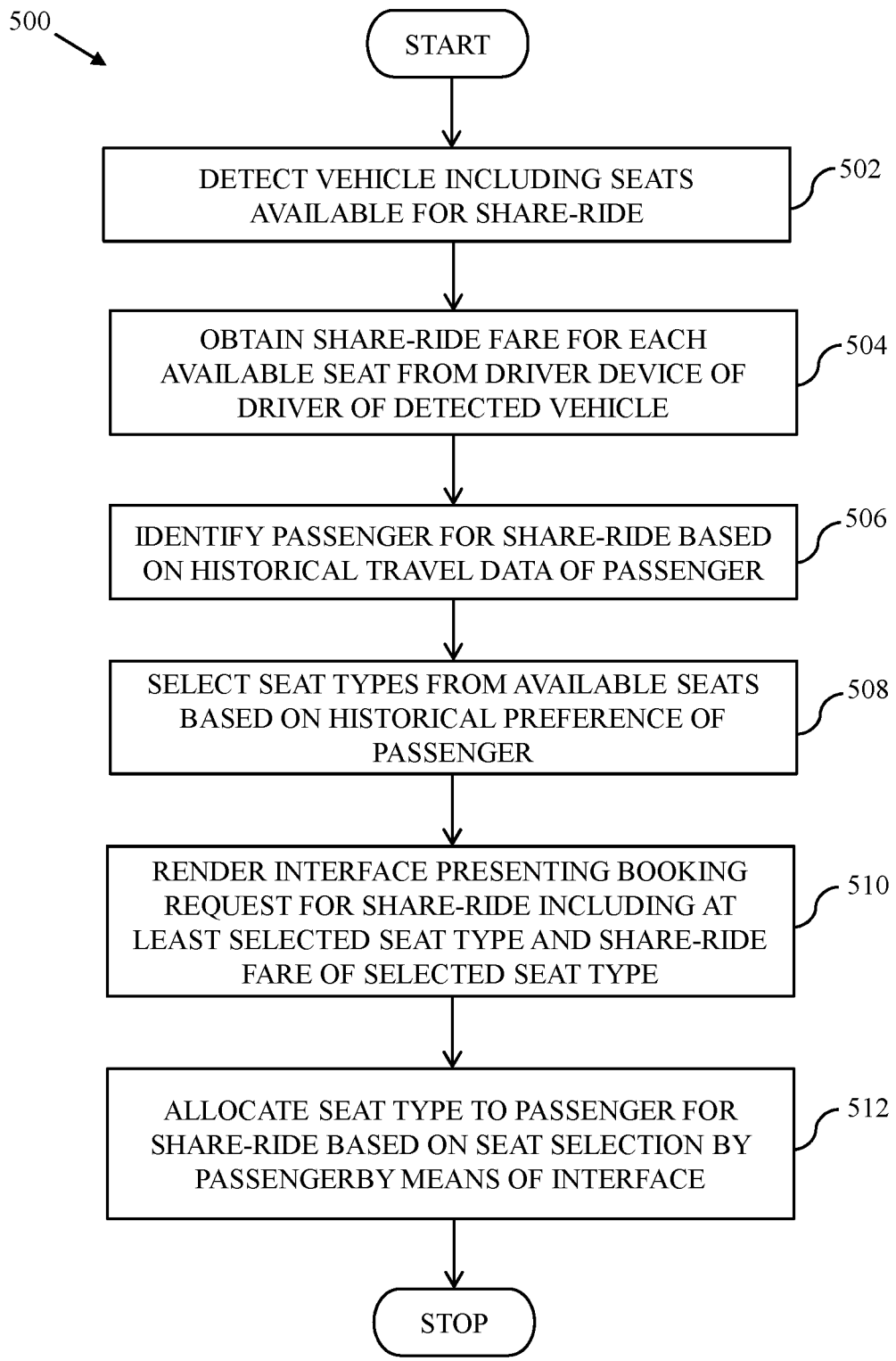
FIG. 5 is a flow chart that illustrates a method for allocating seats to passengers for share-rides in a ride-sharing system, in accordance with an embodiment of the present invention.

Referring now to FIG. 5, a flow chart 500 that illustrates a method for allocating seats for share-rides in a ride-sharing system is shown, in accordance with an embodiment of the present invention.

At step 502, the vehicle 108 is detected in the geographical area based on the real-time vehicle status and position information of the vehicle 108. The vehicle detection engine 206 detects the vehicle 108 in the geographical area. The vehicle 108 includes the seats available for the share-ride. In an embodiment, the availability of the seats in the vehicle 108 may be detected based on the vehicle data provided by the driver of the vehicle 108. In another embodiment, the availability of the seats in the vehicle 108 may be detected based on the current booking information of the vehicle 108. In yet another embodiment, the availability of the seats in the vehicle 108 may be detected based on the sensor data received from the one or more sensors (such as the sensors 316a-316g) associated with the corresponding seat in the vehicle 108.

At step 504, the share-ride fare for each available seat in the vehicle 108 is obtained. The data mining engine 208 obtains the share-ride fare for each available seat from the driver device 106 of the driver of the vehicle 108. The driver of the vehicle 108 may use the driver device 106 to set the share-ride fare for each available seat based on the defined fare range associated with each available seat, and provides an input to transmit the share-ride fare to the data mining engine 208 over the communication network 114.

At step 506, the passenger 112 is identified in the geographical area in which the vehicle 108 has been detected by the vehicle detection engine 206. The processor 202 identifies the passenger 112 based on the historical travel data of the passenger, including that of the geographical area. The historical travel data of each passenger includes at least the historical pick-up and drop-off locations, the frequency of historical rides between each historical pick-up and drop-off locations, the time range of each historical ride, or the historical preferences of each passenger for the seat type and the vehicle type.

At step 508, the seat types that are preferred by the passenger 112 are selected from the available seat types associated with the available seats in the vehicle 108. The seat selection engine 210 selects the preferred seat types based on the historical preferences of the passenger 112 for the seat types. In an exemplary embodiment, the seat selection engine 210 may determine a preference score of the passenger 112 for each seat type based on the historical preferences of the passenger 112 for the seat types. For example, out of 10 historical share-rides, the passenger 112 preferred sitting on the middle row right window seat (M1) for 8 times and on the back row middle seat (B2) for 2 times. Thus, a first preference score of the passenger 112 for the middle row right window seat (M1) is 0.8 (=8 divided by 10), and a second preference score of the passenger 112 for the back row middle seat (B2) is 0.2 (=2 divided by 10). The first preference score (i.e., 0.8) is greater than a defined preference score (e.g., 0.4) in comparison to the second preference score (i.e., 0.2). In such a scenario, the middle row right window seat (M1) may be determined as the preferred seat of the passenger 112 by the seat selection engine 210. After determining the seating preferences of the passenger 112, the fare calculator engine 212 calculates the share-ride fare for the selected seat type based on the share-ride fare set by the driver of the vehicle 108.

At step 510, the notification engine 214 renders the notification interface, for example, the first notification interface 402 on the passenger device 110 of the passenger 112 over the communication network 114. The first notification interface 402 presents the booking request to the passenger 112 for the share-ride, and includes at least the selected seat types and the share-ride fare for each seat type for the share-ride. The booking request may further include the pick-up time and the drop-off time for the passenger 112. The pick-up time may be determined based on the historical travel data of the passenger 112, and the drop-off time may be determined based on at least the drop-off locations of the co-passengers including the passenger 112 in the share-ride and the real-time traffic conditions. The first notification interface 402 further includes the plurality of options, such as the first, second, and third options 404-408. The first option 404 is the confirm booking option that is selectable by the passenger 112 to confirm the booking request. The second option 406 is the reject booking option that is selectable by the passenger 112 to reject the booking request. The third option 408 is the false positive option that is selectable by the passenger 112 to report that the recommendation is not correct and mark the recommendation as a false positive.

At step 512, the passenger 112 selects at least one of the seat types presented on the first notification interface 402, and provides an input corresponding to the first option 404 i.e., the passenger 112 selects the confirm booking option on the first notification interface 402. In response to the selection of the confirm booking option by the passenger 112, the allocation engine 216 allocates the vehicle 108 and the preferred seat associated with the preferred seat type (selected by the passenger 112) to the passenger 112 for the share-ride.

Figure 6:
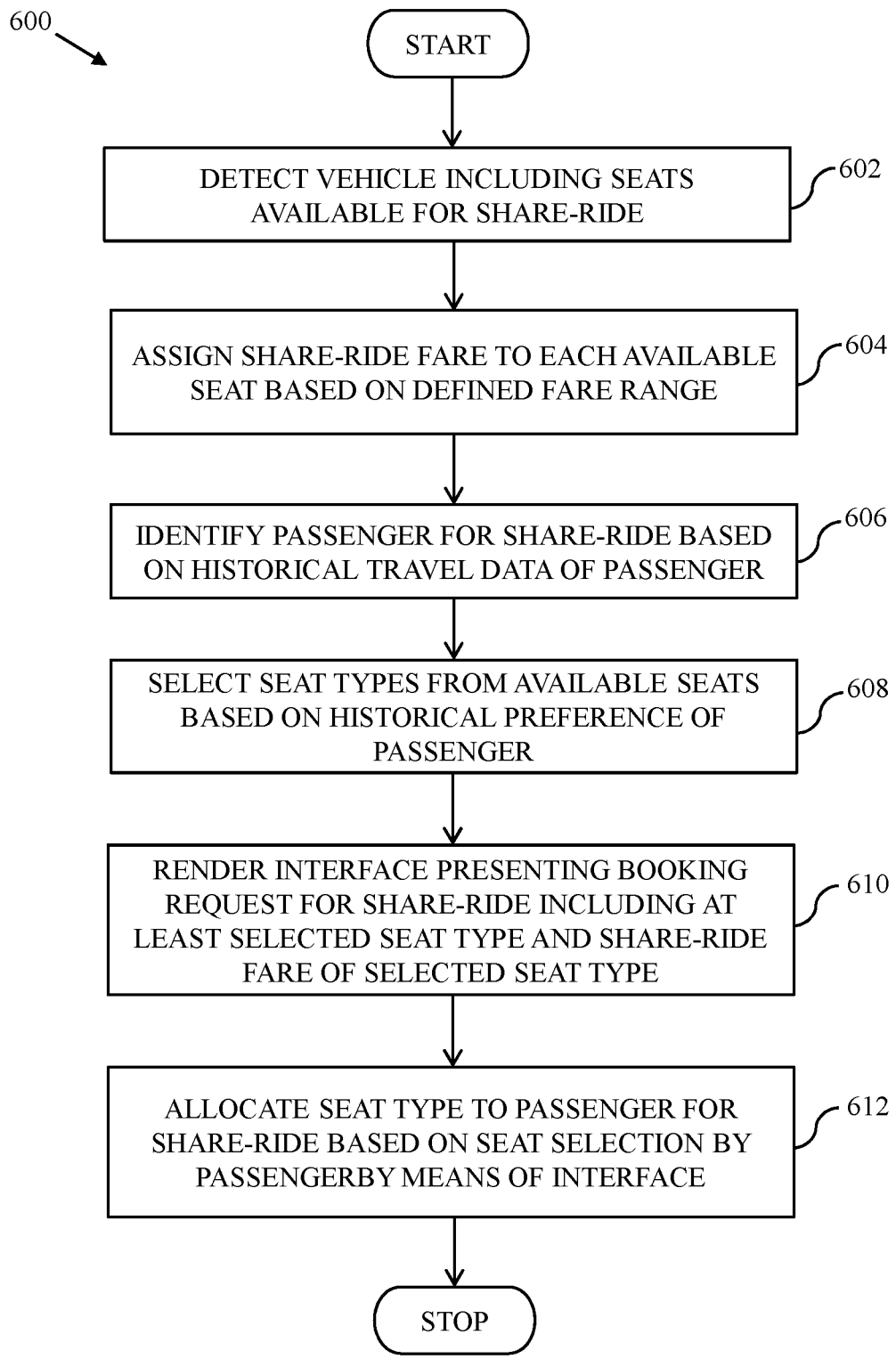
FIG. 6 is a flow chart that illustrates a method for allocating seats to passengers for share-rides in a ride-sharing system, in accordance with another embodiment of the present invention.

Referring now to FIG. 6, a flow chart 600 that illustrates a method for allocating seats for share-rides in the ride-sharing system is shown, in accordance with another embodiment of the present invention.

At step 602, the vehicle 108 is detected in the geographical area based on the real-time vehicle status and position information of the vehicle 108. The vehicle detection engine 206 detects the vehicle 108 in the geographical area. The vehicle 108 includes the seats available for the share-ride. The availability of the seats in the vehicle 108 may be detected based on at least one of the vehicle data, the current booking information, or the sensor data.

At step 604, the share-ride fare for each available seat in the vehicle 108 is assigned. The fare calculator engine 212 assigns the share-ride fare for each available seat when the driver of the vehicle 108 does not want to set the share-ride fare, and allows the fare calculator engine 212 to assign the share-ride fare. The fare calculator engine 212 may set the share-ride fare for each available seat based on the defined fare range associated with each available seat.

At step 606, the passenger 112 is identified in the geographical area in which the vehicle 108 has been detected by the vehicle detection engine 206. The processor 202 identifies the passenger 112 based on the historical travel data of the passenger 112, including that of the geographical area.

At step 608, the seat types that are preferred by the passenger 112 are selected from the available seat types associated with the available seats in the vehicle 108. The seat selection engine 210 selects the preferred seat types based on the historical preferences of the passenger 112 for the seat types.

At step 610, the notification engine 214 renders the notification interface, for example, the first notification interface 402 on the passenger device 110 of the passenger 112 over the communication network 114. The first notification interface 402 presents the booking request to the passenger 112 for the share-ride, and includes at least the selected seat types from the available seats and the share-ride fare of each selected seat type for the share-ride. The booking request may further include the pick-up time and the drop-off time for the passenger 112. The first notification interface 402 further includes the plurality of options, such as the first, second, and third options 404-408. The first option 404 is the confirm booking option that is selectable by the passenger 112 to confirm the booking request. The second option 406 is the reject booking option that is selectable by the passenger 112 to reject the booking request. The third option 408 is the false positive option that is selectable by the passenger 112 to report that the recommendation is not correct and mark the recommendation as a false positive.

At step 612, the passenger 112 selects at least one of the seat types presented on the first notification interface 402, and provides an input corresponding to the first option 404 i.e., the passenger 112 selects the confirm booking option on the first notification interface 402. In response to the selection of the confirm booking option by the passenger 112, the allocation engine 216 allocates the vehicle 108 and the preferred seat associated with the preferred seat type (selected by the passenger 112) to the passenger 112 for the share-ride.

Figure 7:
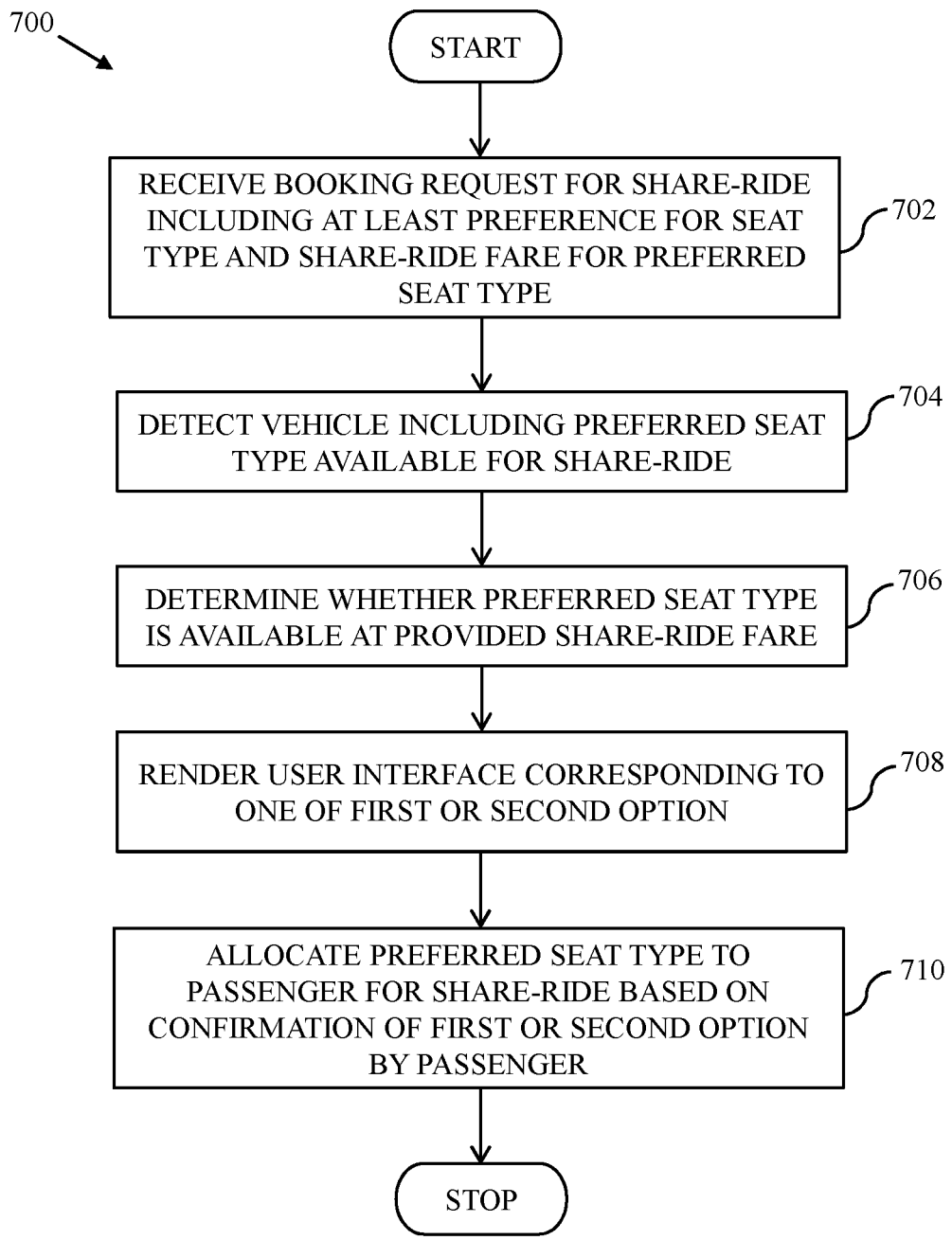
FIG. 7 is a flow chart that illustrates a method for allocating seats to passengers for share-rides in a ride-sharing system, in accordance with another embodiment of the present invention.

Referring now to FIG. 7, a flow chart 700 that illustrates a method for allocating seats for share-rides in the ride-sharing system is shown, in accordance with another embodiment of the present invention.

At step 702, the booking request for the share-ride is received. The processor 202 receives the booking request from the passenger device 110 of the passenger 112 over the communication network 114 by way of the transceiver 218. The booking request includes the preference of the passenger 112 for the seat type and the share-ride fare for the preferred seat type. The booking request may further include at least one of the preference of the passenger 112 for the vehicle type, the pick-up location, the drop-off location, or the pick-up time.

At step 704, the vehicle 108 is detected in the geographical area of the passenger 112 based on the real-time vehicle status and position information of the vehicle 108. The vehicle detection engine 206 detects the vehicle 108 in the geographical area. The vehicle 108 includes the preferred seat type and is available for the share-ride. The availability of the preferred seat type in the vehicle 108 may be detected based on at least one of the vehicle data, the current booking information, or the sensor data.

At step 706, the fare calculator engine 212 determines whether the seat associated with the preferred seat type is available for the share-ride at the share-ride fare specified by the passenger 112. In an embodiment, the specified share-ride fare is compared with the defined fare range associated with the preferred seat type. Based on the comparison i.e., when the specified share-ride fare is within the defined fare range, the fare calculator engine 212 determines that the seat associated with the preferred seat type is available for the share-ride at the specified share-ride fare.

In another embodiment, firstly, the fare calculator engine 212 determines whether the specified share-ride fare is within the defined fare range or not, based on the comparison. When the specified share-ride fare is within the defined fare range, the processor 202 may transmit a query to the driver device 106 of the driver and may request the driver to confirm the share-ride fare specified by the passenger 112 for the share-ride. Based on the confirmation of the specified share-ride fare for the preferred seat type by the driver of the vehicle 108, the fare calculator engine 212 may determine that the seat associated with the preferred seat type is available for the share-ride at the share-ride fare specified by the passenger 112.

At step 708, the notification engine 214 renders the notification interface, for example, the second notification interface 410 or 416 on the passenger device 110 of the passenger 112 over the communication network 114. The notification engine 214 renders the second notification interface 410 on the passenger device 110 corresponding to the first booking option i.e., when the seat associated with the preferred seat type in the vehicle 108 is available for the share-ride at the specified share-ride fare, as described above in conjunction with FIG. 4B. The notification engine 214 renders the second notification interface 416 on the passenger device 110 corresponding to the second booking option i.e., when the seat associated with the preferred seat type in the vehicle 108 is unavailable for the share-ride at the share-ride fare specified by the passenger 112, and includes the new share-ride fare for the preferred seat type, as described above in conjunction with FIG. 4C.

At step 710, the allocation engine 216 allocates the seat associated with the preferred seat type to the passenger 112 for the share-ride based on the confirmation of one of the first or second booking option. In an embodiment, the passenger 112 may select the confirm booking option (i.e., the first option 412 in FIG. 4B) on the second notification interface 410 to confirm the first booking option. Similarly, the passenger 112 may select the confirm booking option (i.e., the first option 418 in FIG. 4C) on the second notification interface 416 to confirm the second booking option. After the confirmation of one of the first or second booking option, the allocation engine 216 allocates the seat associated with the preferred seat type to the passenger 112 for the share-ride. The allocation engine 216 further allocates the vehicle 108 including the allocated (preferred) seat to the passenger 112 for the share-ride.

Figure 8:
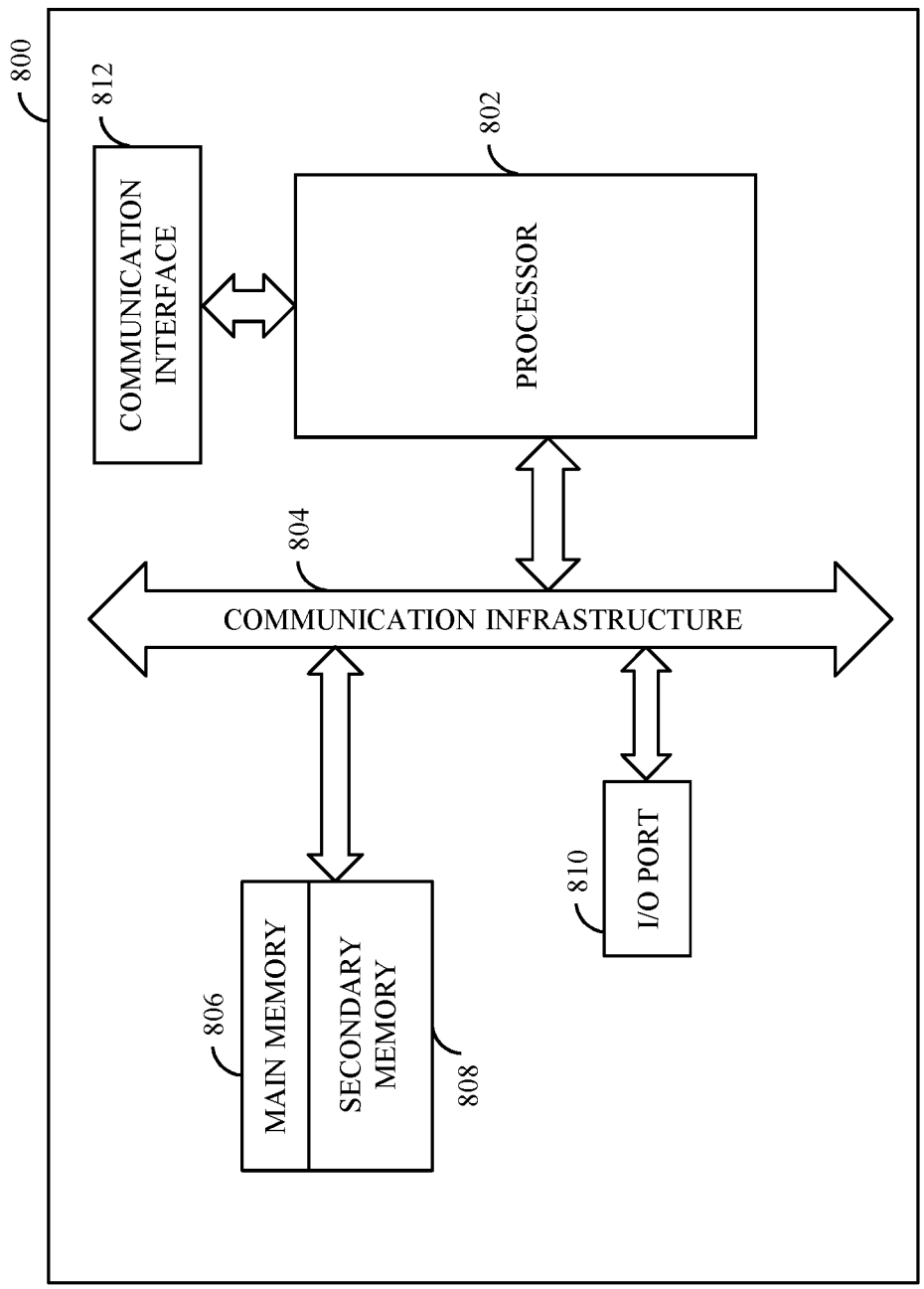
FIG. 8 is a block diagram that illustrates a computer system for allocating seats to passengers for share-rides in a ride-sharing system, in accordance with an embodiment of the present invention.

Referring now to FIG. 8, a block diagram that illustrates a computer system 800 for allocating the seats (e.g., the seats 304-314) of the vehicle 108 to the passengers for the share-ride in the ride-sharing system is shown, in accordance with an embodiment of the present invention. An embodiment of the present invention, or portions thereof, may be implemented as computer readable code on the computer system 800. In one example, the database server 102 and the application server 104 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5, 6, and 7.

The computer system 800 includes a processor 802 that may be a special purpose or a general purpose processing device. The processor 802 may be a single processor, multiple processors, or combinations thereof. The processor 802 may have one or more processor "cores." Further, the processor 802 may be connected to a communication infrastructure 804, such as a bus, a bridge, a message queue, the communication network 114, multi-core message-passing scheme, or the like. The computer system 800 further includes a main memory 806 and a secondary memory 808. Examples of the main memory 806 may include random access memory (RAM), read-only memory (ROM), and the like. The secondary memory 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 800 further includes an input/output (I/O) port 810 and a communication interface 812. The I/O port 810 includes various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communications port, and the like. Data transferred via the communication interface 812 may be signals, such as electronic, electromagnetic, optical, or other signals as will be apparent to a person skilled in the art. The signals may travel via a communications channel, such as the communication network 114 which may be configured to transmit the signals to the various devices that are communicatively coupled to the computer system 800. Examples of the communication channel may include, but are not limited to, cable, fiber optics, a phone line, a cellular phone link, a radio frequency link, a wireless link, and the like.

Computer program medium and computer usable medium may refer to memories, such as the main memory 806 and the secondary memory 808, which may be a semiconductor memory such as dynamic RAMs. These computer program mediums may provide data that enables the computer system 800 to implement the methods illustrated in FIGS. 5, 6, and 7. In an embodiment, the present invention is implemented using a computer implemented application. The computer implemented application may be stored in a computer program product and loaded into the computer system 800 using the removable storage drive or the hard disc drive in the secondary memory 808, the I/O port 810, or the communication interface 812.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 802, and a memory, such as the main memory 806 and the secondary memory 808, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present invention provide, among other features, systems and methods for allocating seats for the share-ride in the ride-sharing system. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A seat allocation method in a ride-sharing system, the seat allocation method comprising:
    in an application server:
        detecting, in a geographical area, a vehicle available for a share-ride based on position information of the vehicle and real-time vehicle status of the vehicle;
        receiving in real time, sensor data from a plurality of sensors installed at a plurality of seats in the detected vehicle, wherein the sensor data indicates at least one of a pressure or a force sensed by the plurality of sensors on the corresponding plurality of seats;
        detecting one or more available seats from the plurality of seats based on the received sensor data, wherein the one or more available seats are unoccupied;
        determining a share-ride fare for each of the one or more available seats-based on a defined fare range associated with each available seat of the one or more available seats, and a density of historical demands associated with the geographical area;
    identifying from a plurality of passengers in the geographical area, a passenger for the share-ride based on historical travel data of the passenger, wherein the historical travel data of the passenger includes historical preferences of the passenger;
    selecting one or more seat types from one or more available seat types associated with the one or more available seats based on the historical preferences of the passenger for the one or more seat types;
    rendering on a passenger device of the passenger over a communication network, a user interface, wherein the user interface presents a booking request to the passenger for the share-ride, and wherein the booking request includes the one or more seat types that are selected from the one or more available seat types and the determined share-ride fare of each of the one or more seats corresponding to the one or more seat types; and
    controlling an allocation of at least one of the one or more available seats to the passenger for the share-ride based on a selection of a seat type performed by the passenger from the one or more seat types by means of the rendered user interface.

2. The method of claim 1, wherein the position information of the vehicle and the real-time vehicle status are obtained from a driver device associated with the vehicle.

3. The method of claim 1, wherein the one or more available seats in the vehicle are further detected based on at least one of received vehicle data and current booking information of the vehicle.

4. The method of claim 1, wherein the historical travel data of the passenger comprises historical pick-up and drop-off locations, a frequency of historical rides between each historical pick-up and drop-off locations, and a time range of each historical ride.

5. The method of claim 1, further comprising determining a preference score of the passenger for each available seat type of the one or more available seat types based on the historical preferences of the passenger, wherein the one or more seat types are further selected based on the determined passenger score for each available seat type of the one or more available seat types.

6. The method of claim 1, wherein the booking request further includes a pick-up time and a drop-off time for the passenger, wherein the pick-up time is determined based on the historical travel data of the passenger, and the drop-off time is determined based on at least drop-off locations of co-passengers in the share-ride and real-time traffic conditions.

7. The method of claim 1, wherein the user interface further includes a plurality of options including at least first, second, and third options, wherein the first option is selectable by the passenger to confirm the booking request, the second option is selectable by the passenger to reject the booking request, and the third option is selectable by the passenger to indicate a false positive recommendation.

8. The method of claim 1, further comprising:
    re-learning one or more travel preferences of the passenger based on the historical travel data and the selection of the seat type performed by the passenger; and
    generating a new set of travel-related recommendations for future rides of the passenger based on the re-learning.

9. A ride-sharing system, comprising:
    an application server configured to:
        detect in a geographical area, a vehicle available for a share-ride based on position information of the vehicle and real-time vehicle status of the vehicle;
        receive in real-time, sensor data from a plurality of sensors installed at a plurality of seats in the detected vehicle, wherein the sensor data indicates at least one of a pressure or a force sensed by the plurality of sensors on the corresponding plurality of seats;
        detect one or more available seats from the plurality of seats based on the received sensor data, wherein the one or more available seats are unoccupied;
        determine a share-ride fare for each of the one or more available seats based on a defined fare range associated with each available seat of the one or more available seats, and a density of historical demands associated with the geographical area;

identify, from a plurality of passengers in the geographical area, a passenger for the share-ride based on historical travel data of the passenger, wherein the historical travel data of the passenger includes historical preferences of the passenger;

select one or more seat types from one or more available seat types associated with the one or more available seats based on the historical preferences of the passenger for the one or more seat types;

render, on a passenger device of the passenger over a communication network, a user interface, wherein the user interface presents a booking request to the passenger for the share-ride, and wherein the booking request includes at least the one or more seat types that are selected from the one or more available seat types and the share-ride fare of each of the one or more seats corresponding to the one or more seat types; and control an allocation of at least one of the one or more available seats to the passenger for the share-ride based on a selection of a seat type performed by the passenger from the one or more seat types by means of the rendered user interface.

10. The ride-sharing system of claim 9, wherein the real-time vehicle status and the position information of the vehicle are obtained from a driver device associated with the vehicle.

11. The ride-sharing system of claim 9, wherein the one or more available seats in the vehicle are further detected based on at least one of received vehicle data of the vehicle and current booking information of the vehicle.

12. The ride-sharing system of claim 9, wherein the historical travel data of the passenger includes historical pick-up and drop-off locations, a frequency of historical rides between each historical pick-up and drop-off locations, and a time range of each historical ride.

13. The ride-sharing system of claim 9, wherein the application server is further configured to determine a preference score of the passenger for each available seat type of the one or more available seat types based on the historical preferences of the passenger, wherein the one or more seat types are further selected based on the determined passenger score for each available seat type of the one or more available seat types.

14. The ride-sharing system of claim 9, wherein the booking request further includes a pick-up time and a drop-off time for the passenger, wherein the pick-up time is determined based on the historical travel data of the passenger, and the drop-off time is determined based on at least drop-off locations of co-passengers in the share-ride and real-time traffic conditions.

15. The ride-sharing system of claim 9, wherein the user interface further includes a plurality of options including at least first, second, and third options, wherein the first option is selectable by the passenger to confirm the booking request, the second option is selectable by the passenger to reject the booking request, and the third option is selectable by the passenger to indicate a false positive recommendation.

16. A seat allocation method in a ride-sharing system, the seat allocation method comprising:

in an application server:

detecting in a geographical area, a vehicle available for a share-ride;

receiving in real time, sensor data from a plurality of sensors installed at a plurality of seats in the detected vehicle, wherein the sensor data indicates at least one of a pressure or a force sensed by the plurality of sensors on the corresponding plurality of seats;

detecting one or more available seats from the plurality of seats based on the received sensor data, wherein the one or more available seats are unoccupied;

determining a share-ride fare for each of the one or more available seats based on at least one of a defined fare range associated with each available seat of the one or more available seats, and a density of historical demands associated with the geographical area;

identifying, from a plurality of passengers in the geographical area, a passenger for the share-ride based on historical travel data of the passenger;

rendering a user interface on a passenger device of the passenger over a communication network, wherein the user interface presents a booking request to the passenger for the share-ride, and wherein the booking request includes one or more seat types selected from the one or more available seats and the determined share-ride fare of each of the one or more seats corresponding to the one or more seat types; and allocating at least one of the one or more available seats to the passenger for the share-ride based on a selection of a seat type performed by the passenger from the one or more seat types by means of the rendered user interface.

\* \* \* \* \*